(12) United States Patent
Balasubramanian

(10) Patent No.: US 8,819,658 B2
(45) Date of Patent: Aug. 26, 2014

(54) METHODS AND SYSTEMS FOR MANAGING UPDATE REQUESTS FOR A DEPLOYED SOFTWARE APPLICATION

(75) Inventor: Anand Balasubramanian, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 586 days.

(21) Appl. No.: 12/640,295

(22) Filed: Dec. 17, 2009

(65) Prior Publication Data

US 2011/0154314 A1 Jun. 23, 2011

(51) Int. Cl.
*G06F 9/44* (2006.01)

(52) U.S. Cl.
USPC .......................................... 717/168

(58) Field of Classification Search
USPC .......................................... 717/168
See application file for complete search history.

(56) References Cited

U.S. PATENT DOCUMENTS

| 6,701,519 B1* | 3/2004 | Cowan ........................... 717/130 |
| 2005/0071838 A1* | 3/2005 | Hatasaki ....................... 717/168 |
| 2007/0106979 A1* | 5/2007 | Felts .............................. 717/124 |
| 2008/0082517 A1* | 4/2008 | Sattler et al. ....................... 707/5 |
| 2009/0222811 A1* | 9/2009 | Faus et al. ..................... 717/173 |

* cited by examiner

*Primary Examiner* — Li B Zhen
*Assistant Examiner* — Lenin Paulino

(57) ABSTRACT

An exemplary method includes receiving data representative of an update request for a deployed software application, assigning an update request identifier to the update request, displaying a portal configured to facilitate management of a plurality of software development operations associated with the update request, receiving a request input by a user via the portal to perform a software development operation included within the plurality of software development operations associated with the update request, establishing a link between the requested software development operation and the update request identifier, and using the established link to track the update request throughout a software development lifecycle of a software update created in response to the update request. Corresponding methods and systems are also disclosed.

17 Claims, 12 Drawing Sheets

| Update Request Manager | | | | | | |
|---|---|---|---|---|---|---|
| UR Home | Environments | Branches | Builds | Testing | Releases | |

Summary

UR # 5002 – Actual invoice counting wrong

Description: Actual invoice counting wrong
Module: PM > Work Request > Cost Distribution
Contact: Moe
Originated By: Joe
Submitted By: Ashley
Submitted On: 9/12/09
Priority: Normal
Type: Bug
Status: Open Options Reassign To: Larry
Status: All
Notify: Yes
Response Text: Please fix this issue.

Priority: Normal
Type: Bug

Fig. 6

METHODS AND SYSTEMS FOR MANAGING UPDATE REQUESTS FOR A DEPLOYED SOFTWARE APPLICATION

BACKGROUND INFORMATION

After a software application is released and deployed, developers of the software application are often faced with the daunting task of dealing with a plethora (e.g., thousands) of bug reports and enhancement requests. It is often difficult to prioritize such bug reports and enhancement requests, coordinate activity among multiple developers working on the software application, and verify that each bug report and enhancement request is properly addressed.

For example, in order to implement a particular enhancement request or fix a particular bug, a developer often has to modify source code of the software application. To do so, the developer may have to reserve a particular environment (e.g., a particular combination of servers and databases) and obtain permission to modify a particular portion of the source code. Heretofore, the developer would typically have to email an administrator of the environment and/or a source code repository that maintains the source code in order to reserve the environment and obtain permission to modify the source code. The administrator may receive hundreds or even thousands of similar requests from other developers, thus making it difficult to keep track of each individual request, respond in a timely manner, and coordinate activity among all of the developers.

Moreover, software developers often have to comply with strict auditing requirements that require certain procedures to be followed when dealing with bug reports and enhancement request. It is often cumbersome and time consuming to ensure that each bug report or enhancement request complies with such auditing requirements.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-12 illustrate various views of an exemplary portal that may be configured to facilitate management of a plurality of update requests associated with a deployed software application.

DETAILED DESCRIPTION OF PREFERRED EMBODIMENTS

Figure 1:
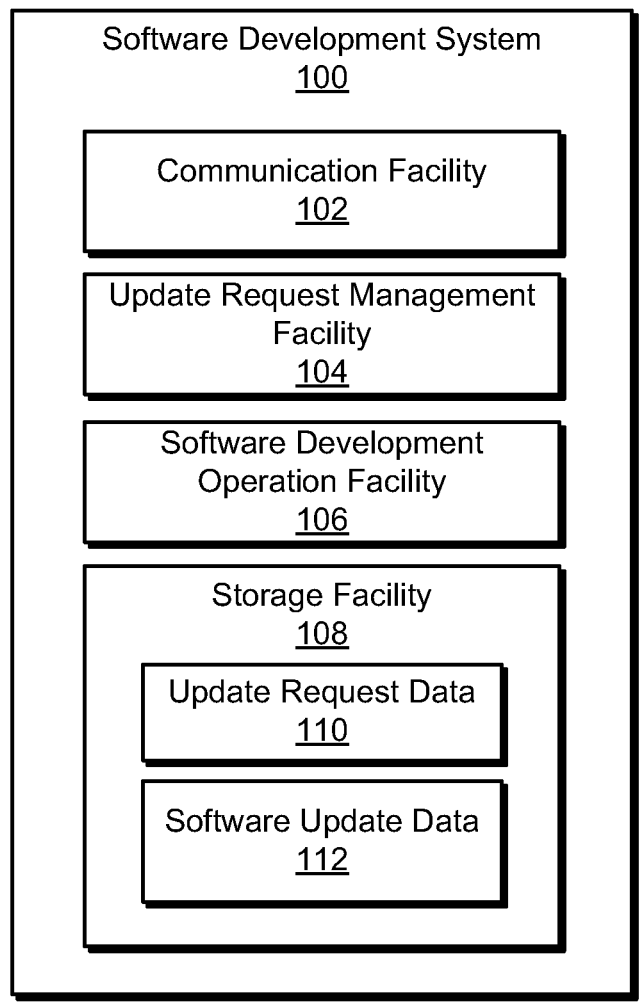
FIG. 1 illustrates an exemplary software development system according to principles described herein.

Exemplary methods and systems for managing update requests for a deployed software application are described herein. In some examples, a software development system may receive data representative of an update request for a deployed software application, assign an update request identifier to the update request, and display a portal configured to facilitate management of a plurality of software development operations associated with the update request. The software development system may further receive a request input by a user via the portal to perform a software development operation included within the plurality of software development operations associated with the update request, establish a link between the requested software development operation and the update request identifier, and use the established link to track the update request throughout a software development lifecycle of a software update created in response to the update request.

As used herein, an "update request" may include any request or report transmitted to the software development system by a user that, if addressed by one or more software developers, may result in a software update being created for the software application. For example, an update request may include or be generated in response to an identification of a bug or defect in the software application (referred to herein as an "incident report"). Additionally or alternatively, an update request may include or be generated in response to a request to add an enhancement to the software application (referred to herein as a "change request"). An update request may be generated by any user of the software application, including, but not limited to, an end-user of the software application and/or one or more personnel (e.g., developers, administrators, testers, etc.) associated with the development of the software application.

As used herein, a "software development operation" associated with an update request may include one or more environment selection operations (e.g., a reservation of an environment in order to implement the update request), one or more branch operations (e.g., a creation of a new branch in a source code repository in order to implement the update request and/or a merging of the new branch back into the source code repository), one or more build operations (e.g., a build and automatic deployment of source code modified or generated to implement the update request), one or more test operations (e.g., a system test and/or a user acceptance test of the source code implementing the update request), one or more software release operations (e.g., a release of a software update implementing the update request, an approval of a deployment of the software update, and a verification of a release of the software update), and/or any other operation associated with the update request.

The methods and systems described herein may allow software development personnel to accurately, easily, and efficiently manage a plurality of update requests associated with a deployed software application. The methods and systems described herein may further provide for automated tracking of each update request throughout a software development lifecycle of one or more software updates implementing the update requests. The methods and systems may further facilitate automated compliance with one or more auditing requirements.

FIG. 1 illustrates an exemplary software development system 100 (or simply "system 100"). As will be described in more detail below, system 100 may be configured to facilitate management of one or more update requests for a deployed software application. System 100 may include, but is not limited to, a communication facility 102, an update request management facility 104, a software development operation facility 106, and a storage facility 108, which may be in communication with one another using any suitable communication technologies. It will be recognized that although facilities 102-108 are shown to be separate facilities in FIG. 1, any of those facilities may be combined into a single facility as may serve a particular implementation. Facilities 102-108 will now be described in more detail.

Communication facility 102 is configured to facilitate communication between system 100 and one or more computing devices (e.g., end-user devices, servers, etc.). Communication facility 102 may be further configured to facilitate communication between one or more components that implement system 100. For example, communication facility 102 may be configured to facilitate communication between a user access device (e.g., a personal computer) associated with a developer, an administrator, a tester, and/or other user and one or more servers, databases, and/or other components that implement at least a portion of system 100.

In some examples, communication facility 102 may be configured to facilitate deployment of a software application and/or one or more updates to the software application. The software application may include any type of application as may serve a particular implementation. For example, the software application may include an application configured to be deployed on a relatively large scale and concurrently used by multiple users.

Communication facility 102 may be further configured to receive data representative of update requests for the deployed software application. As mentioned, the update requests may each include an identification of a bug or defect in the deployed software application (i.e., an "incident report"), a request to add an enhancement to the software application (i.e., a "change request"), and/or any other type of request associated with the deployed software application that, if addressed by software developers, may result in a software update being created for the deployed software application.

Update request management facility 104 may be configured to manage the update requests received by communication facility 102. To this end, update request management facility 104 may assign a unique update request identifier to each update request received by communication facility 102. Each update request identifier may include a sequence of characters (e.g., an identification number) specific to its corresponding update request.

Update request management facility 104 may be further configured to generate and display a portal configured to facilitate management of a plurality of software development operations associated with each update request. As described above, such software development operations may include one or more environment selection operations associated with each update request, one or more branch operations associated with each update request, one or more build operations associated with each update request, one or more test operations associated with each update request, one or more software release operations associated with each update request, and/or any other operation associated with the update requests.

The portal displayed by update request management facility 104 may include one or more graphical user interfaces with which one or more users of system 100 (e.g., developers, administrators, testers, auditors, and/or any other user) may interface in order to manage the update requests. For example, a user may view detailed information about each update request, view the status of each update request, assign responsibility of the update requests to different developers, access audit trails associated with each update request, and input requests to perform one or more software development operations associated with each update request by way of the portal. In some examples, the portal is web-based to facilitate remote access by multiple users at different locations.

In some examples, update request management facility 104 may receive, via the portal, a request input by a user to perform a software development operation associated with a particular update request received by communication facility 102. In response, update request management facility 104 may establish a link between the requested software development operation and an update request identifier assigned to the particular update request. Update request management facility 104 may use the established link to track the update request throughout a software development lifecycle of a software update created in response to the update request. Examples of receiving a request to perform a software development operation by way of the portal, establishing a link between the requested software development operation and an update request identifier assigned to the particular update request, and using the established link to track the update request throughout a software development lifecycle of a software update created in response to the update request will be given below.

Software development operation facility 106 may be configured to perform or facilitate performance of one or more software development operations associated with an update request. For example, software development operation facility 106 may perform one or more environment selection operations associated with the update request, one or more branch operations associated with the update request, one or more build operations associated with the update request, one or more test operations associated with the update request, one or more software release operations associated with the update request, and/or any other operation associated with the update request. Examples of each of these software development operations will be given below.

Storage facility 108 may be configured to maintain update request data 110 representative of the update requests received by communication facility 102 and software update data 112 (e.g., source code) representative of one or more software updates generated in response to one or more of the update requests. It will be recognized that storage facility 108 may maintain additional or alternative data as may serve a particular implementation.

System 100, including communication facility 102, update request management facility 104, software development operation facility 106, and storage facility 108, may include any computer hardware and/or computer-implemented instructions (e.g., software), or combinations of computer-implemented instructions and hardware, configured to perform one or more of the processes described herein. For example, system 100, including communication facility 102, update request management facility 104, software development operation facility 106, and storage facility 108, may include computer hardware (e.g., one or more servers and/or other computing devices) configured to perform one or more of the processes described herein. In some examples, each of the facilities 102-108 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Communication facility 102, update request management facility 104, software development operation facility 106, and storage facility 108 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Java, Extensible Markup Language ("XML"), Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Simple Object Access Protocol ("SOAP"), Session Initiation Protocol ("SIP"), Ethernet, and/or any other suitable communications technologies, devices, media, and protocols.

Figure 2:
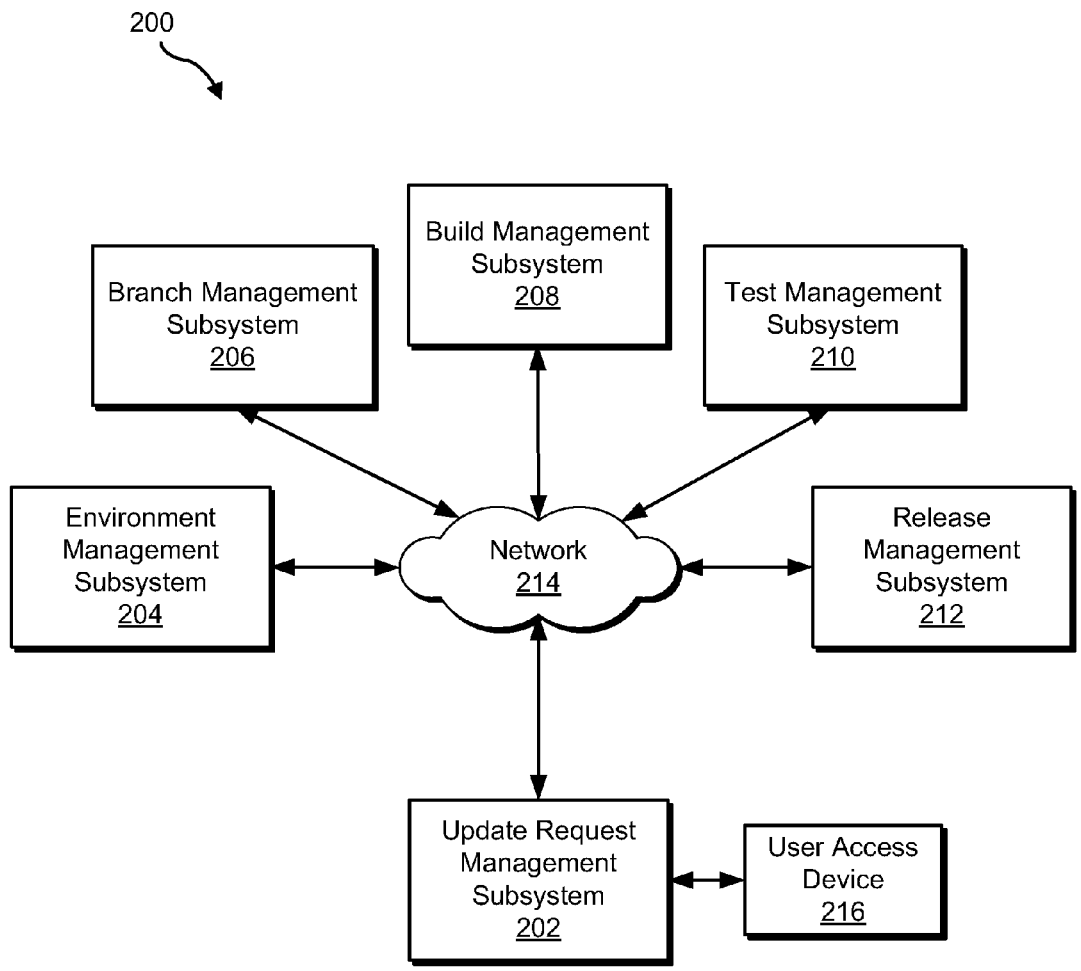
FIG. 2 illustrates an exemplary implementation of the system of FIG. 1 according to principles described herein.

FIG. 2 illustrates an exemplary implementation 200 of system 100 wherein an update request management subsystem 202 is communicatively coupled to an environment management subsystem 204, a branch management subsystem 206, a build management subsystem 208, a test management subsystem 210, and a release management subsystem 212 by way of a network 214. Facilities 102-108 may be implemented by one or more of subsystems 202-212. For example, communication facility 102 and storage facility 108 may be implemented by one or more of subsystems 202-212. Update request management facility 104 may be implemented by update request management subsystem 202. Software development operation facility 106 may be implemented by environment management subsystem 204, branch management subsystem 206, build management subsystem 208, test management subsystem 210, and release management subsystem 212.

Network 214 may include one or more networks or types of networks capable of carrying communications and/or data signals between each of the subsystems 202-212 shown in FIG. 2. For example, network 214 may include, but is not limited to, one or more wireless networks, broadband networks, closed media networks, cable networks, satellite networks, the Internet, intranets, local area networks, public networks, private networks, optical fiber networks, and/or any other networks capable of carrying data and communications signals between subsystems 202-212. Additionally or alternatively, two or more of the subsystems 202-212 shown in FIG. 2 may communicate directly one with another without the use of network 214.

Update request management subsystem 202 may include one or more computing devices (e.g., servers, personal computers, or other network-enabled devices) configured to execute computer-executable instructions (e.g., software modules) in order to perform the functions associated with update request management facility 104. For example, update request management subsystem 202 may include one or more servers configured to maintain update request data 110 representative of a plurality of update requests (e.g., in one or more databases), assign unique update request identifiers to each of the update requests, generate and display a portal configured to facilitate management of the update requests, receive input from a user to perform a software development operation associated with a particular update request, establish a link between the requested software development operation and an update request identifier assigned to the particular update request, and use the established link to track the particular update request throughout a software development lifecycle of a software update created in response to the particular update request.

Likewise, subsystems 204-212 may each include one or more computing devices (e.g., servers, personal computers, or other network-enabled devices) configured to execute computer-executable instructions (e.g., software modules) in order to perform the functions associated with software development operation facility 106. For example, environment management subsystem 204 may include one or more servers configured to perform one or more environment selection operations associated with an update request, branch management subsystem 206 may include one or more servers configured to perform one or more branch operations associated with the update request, build management subsystem 208 may include one or more servers configured to perform one or more build operations associated with the update request, test management subsystem 210 may include one or more servers configured to perform one or more test operations associated with the update request, and release management subsystem 212 may include one or more servers configured to perform one or more software release operations associated with the update request.

It will be recognized that each subsystem 202-212 may be implemented by distinct computing devices. Alternatively, two or more of subsystems 202-212 may be implemented by the same computing device.

In some examples, subsystems 202-212 may each include or be in communication with a user access device configured to facilitate user access to and/or control of one or more operations performed by subsystems 202-212. For example, as shown in FIG. 2, update request management subsystem 202 may be communicatively coupled to a user access device 216. User access device 216 may be configured to access and display the portal generated by update request management subsystem 202 so that a user thereof (e.g., a developer, an administrator, a tester, an auditor, and/or another type of user) may manage the update requests maintained by update request management subsystem 202. User access device 216 may include any suitable computing device such as, but not limited to, a personal computer, a communications device, a mobile device (e.g., a mobile phone device), a handheld device, and/or any other suitable computing device.

Figure 3:
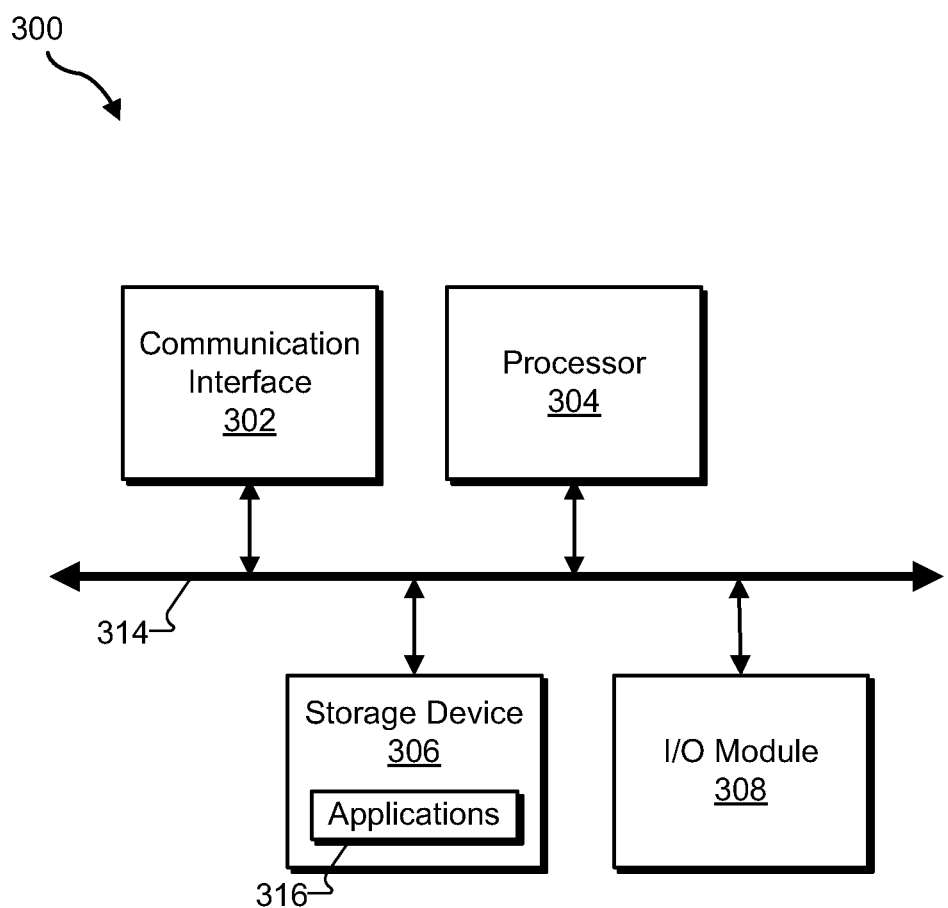
FIG. 3 illustrates an exemplary computing device according to principles described herein.

FIG. 3 illustrates an exemplary computing device 300 that may have any combination of update request management subsystem 202, environment management subsystem 204, branch management subsystem 206, build management subsystem 208, test management subsystem 210, and release management subsystem 212 implemented thereon. Computing device 300 may additionally or alternatively implement user access device 216. Computing device 300 may include one or more of a server, a personal computer, a communications device, and/or any other computing device configured to perform one or more of the processes and/or operations described herein.

As shown in FIG. 3, computing device 300 may include a communication interface 302, a processor 304, a storage device 306, and an I/O module 308 communicatively connected to one another via a communication infrastructure 314. While an exemplary computing device 300 is shown in FIG. 3, the components illustrated in FIG. 3 are not intended to be limiting. Additional or alternative components may be used in other embodiments. Components of computing device 300 shown in FIG. 3 will now be described in additional detail.

Communication interface 302 may be configured to communicate with one or more computing devices. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between two or more of subsystems 202-212 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, a dedicated URL, or any other suitable connection. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 316 or other computer-executable instructions such as may be stored in storage device 306 or another computer-readable medium.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 316 (which may include, but are not limited to, one or more of the software applications described herein) configured to direct processor 304 to perform any of the operations described herein may be stored within storage device 306. In some examples, data may be arranged in one or more databases residing within storage device 306.

I/O module 308 may be configured to receive user input and provide user output and may include any hardware, firmware, software, or combination thereof supportive of input and output capabilities. For example, I/O module 308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 308 is configured to provide graphical data to a display for presentation to a user. The graphical data may be representative of a portal that includes one or more web-based interfaces (e.g., web pages), graphical user interfaces ("GUIs"), and/or any other view as may serve a particular implementation.

In some examples, any of the facilities described herein may be implemented by or within one or more components of computing device 300. For example, one or more applications 316 residing within storage device 306 may be configured to direct processor 304 to perform one or more processes or functions associated with communication facility 102, update request management facility 104, and/or software development operation facility 106. Likewise, storage facility 108 may be implemented by or within storage device 306.

Figure 4:
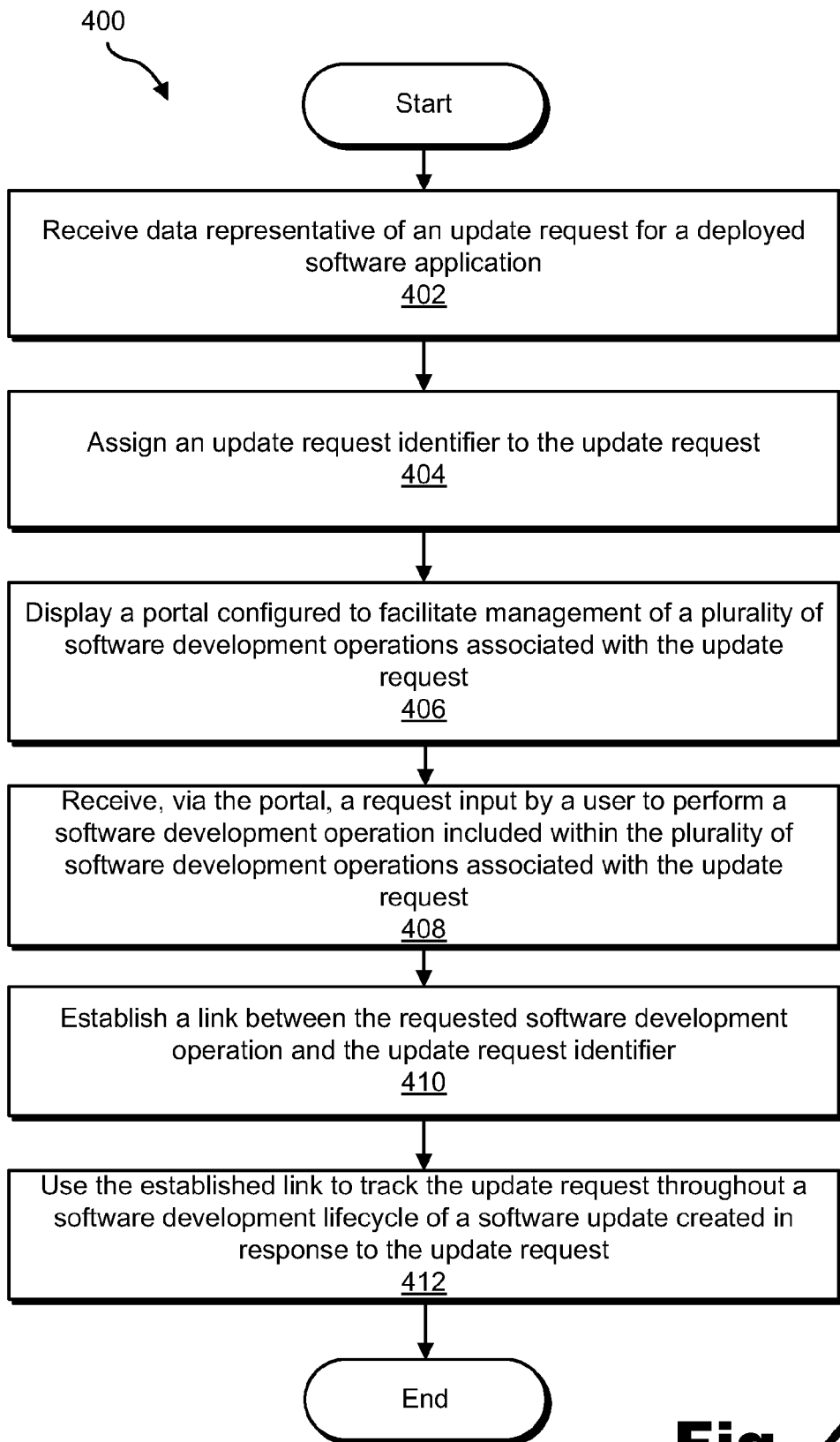
FIG. 4 illustrates an exemplary method of managing update requests for a deployed software application according to principles described herein.

FIG. 4 illustrates an exemplary method 400 of managing update requests for a deployed software application. While FIG. 4 illustrates exemplary steps according to one embodiment, other embodiments may omit, add to, reorder, and/or modify any of the steps shown in FIG. 4. The steps shown in FIG. 4 may be performed by any component of software development system 100.

In step 402, data representative of an update request for a deployed software application is received. The data may be received in any of the ways described herein. For example, a user of the software application may identify a bug and/or a desired enhancement to the software application and transmit data representative of an update request addressing the bug and/or desired enhancement to system 100, which may receive the data representative of the update request in any suitable manner.

In step 404, an update request identifier is assigned to the update request. For example, update request management facility 104 may assign a unique identification number (e.g., "12345") to the update request. The update request may include any sequence of characters as may serve a particular implementation.

In step 406, a portal configured to facilitate management of a plurality of software development operations associated with the update request received in step 402 is displayed. As described previously, the plurality of software development operations may include one or more environment selection operations associated with the update request, one or more branch operations associated with the update request, one or more build operations associated with the update request, one or more test operations associated with the update request, one or more software release operations associated with the update request, and/or any other operation associated with the update request. The portal may be generated and presented for display on a display associated with a user access device (e.g., user access device 216) by update request management facility 104, for example. An exemplary portal that may be generated and displayed by update request management facility 104 will be described in more detail below.

In step 408, a request input by a user to perform a software development operation included within the plurality of software development operations associated with the update request is received via the portal. The request may be received by update request management facility 104 in any suitable manner as may serve a particular implementation. Exemplary requests input by a user to perform a software development operation associated with an update request will be described in more detail below.

In step 410, a link is established between the requested software development operation and the update request identifier. For example, update request management facility 104 may require that the user associate the requested software development operation with the update request identifier before allowing software development operation facility 106 to perform the requested software development operation. Additionally or alternatively, update request management facility 104 may automatically establish the link by recognizing that the user is working within a context of a particular update request when the request to perform the software development operation is received.

In step 412, the link established in step 410 is used to track the update request throughout a software development lifecycle of a software update created in response to the update request. For example, update request management facility 104 may create an audit trail associated with the update request that identifies any activity associated with the update request that occurs during a software development lifecycle of a software update created in response to the update request. Such activity may include a timestamped log of requested software development operations associated with the update request, any assignment of duties associated with the update request, and/or any other activity associated with the update request.

Update request management facility 104 may additionally or alternatively use the established link to track the update request by displaying information in the portal that is representative of a current status of the update request at any time during the software development lifecycle of a software update created in response to the update request. In this manner, a user may access the portal and ascertain the current status of the update request, regardless of where the corresponding software update is during its development lifecycle.

An exemplary implementation of method 400 will now be given in connection with FIGS. 5-12. FIGS. 5-12 illustrate exemplary views of a portal that may be generated and displayed by update request management facility 104. As will be described in more detail below, one or more users may utilize the portal shown in FIGS. 5-12 to manage a plurality of update requests for a deployed software application. It will be recognized that the exemplary views shown in FIGS. 5-12 are merely illustrative and that they may be modified, changed, or added to in any way as may serve a particular implementation.

Figure 5:
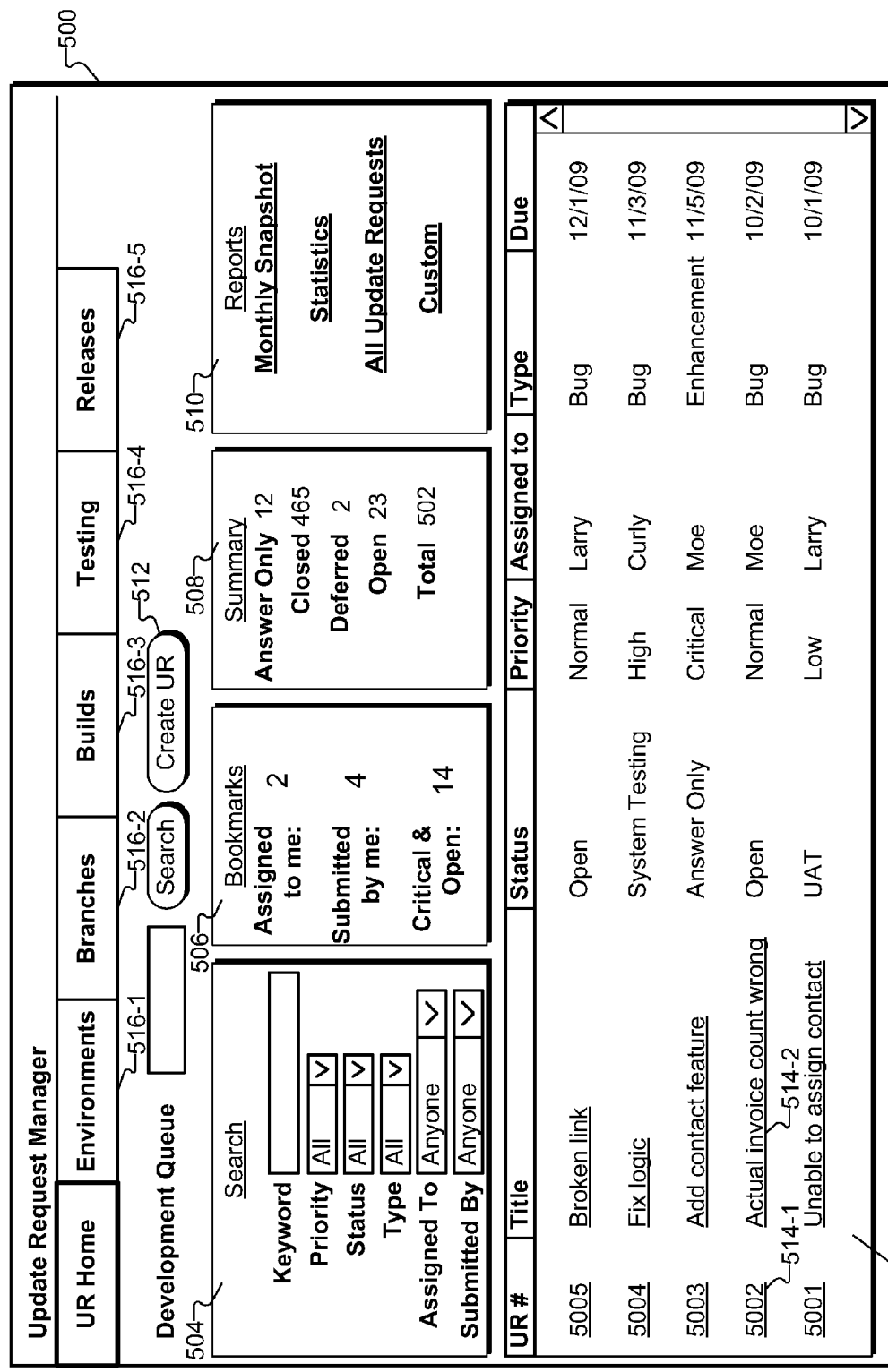

FIG. 5 illustrates an exemplary portal 500 that may be generated and displayed by update request management facility 104 on a display screen of a user access device and that may be configured to facilitate management of a plurality of update requests associated with a deployed software application. Portal 500 may be displayed within a web-browser, a stand-alone application, and/or any other application as may serve a particular implementation.

As shown in FIG. 5, portal 500 may display a list 502 of update requests currently being managed by update request management facility 104. List 502 may include information associated with each update request such as, but not limited to, an update request identifier of each update request, a title of each update request, a status of each update request, a priority of each update request, a name of a user to whom each update request is assigned, a type of each update request, and/or a due date of each update request. In this manner, a user may readily view information associated with a particular update request by locating the particular update request in list 502.

It will be recognized that a relatively large number of update requests (e.g., thousands) may be included in list 502. To assist a user in accessing information associated with a particular update request, various search options 504 may be displayed in portal 500. As shown in FIG. 5, search options 504 may include various search filters configured to narrow the number of entries in list 502 based on user input. Any number of search options 504 may be included within portal 500 as may serve a particular implementation.

Other information associated with the update requests may be displayed in portal 500 as may serve a particular implementation. For example, bookmark information 506 and summary information 508 may be displayed as shown in FIG. 5. Bookmark information 506 may provide a user with a snapshot summary of the number of update requests assigned to or submitted by that user. Bookmark information 506 may additionally or alternatively show a total number of update requests being managed by update request management facility 104 that have been marked as having a "critical" status, as shown in FIG. 5, and/or any other information as may serve a particular implementation. Summary information 508 may show statistics corresponding to system-wide activity associated with the update requests being managed by update request management facility 104.

Portal 500 may additionally or alternatively include a number of selectable options associated with the update requests being managed by update request management facility 104. For example, a user may select one or more reports 510 to generate one or more reports corresponding to one or more update requests. A user may additionally or alternatively select a "create update request" option 512 to create one or more new update requests.

In some examples, an update request included within list 502 may be selected by a user to access additional information associated with that update request. To this end, one or more hyperlinks or the like may be included within list 502. For example, hyperlinks 514-1 and/or 514-2 may be selected to access additional information associated with an update request having an update request identifier of "5002."

FIG. 6 shows portal 500 after either hyperlink 514-1 or 514-2 has been selected. As shown in FIG. 6, additional information 602 associated with the update request having an update request identifier of "5002" may be displayed in response to a user selection of hyperlinks 514-1 and/or 514-2. Various options 604 associated with the selected update request may also be displayed. For example, a user may reassign the selected update request to a different user (e.g., a developer tasked to implement the update request), update a status of the selected update request, notify one or more users of the reassignment, input one or more notes related to the reassignment, update a priority of the selected update request, update a type of the selected update request, and/or modify any other aspect of the selected update request as may serve a particular implementation.

Returning to FIG. 5, one or more selectable options 516 (e.g., options 516-1 through 516-5) may be displayed in portal 500 and configured to facilitate management of various software development operations associated with one or more update requests. For example, a user may select an "environments" option 516-1 to input a request for software development operation facility 106 to perform one or more environment selection operations, a "branches" option 516-2 to input a request for software development operation facility 106 to perform one or more branch operations, a "builds" option 516-3 to input a request for software development operation facility 106 to perform one or more build operations, a "testing" option 516-4 to input a request for software development operation facility 106 to perform one or more test operations, and/or a "releases" option 516-5 to input a request for software development operation facility 106 to perform one or more software release operations.

To illustrate, a developer tasked with developing a software update that implements the update request having the update request identifier of "5002" may determine that a particular environment (e.g., a particular combination of application servers, web servers, and databases) is needed to implement the update request. Hence, the developer may need to reserve the particular environment for a predetermined amount of time so that work concurrently performed by other developers does not alter the environment while the developer implements the update request.

Figure 7:
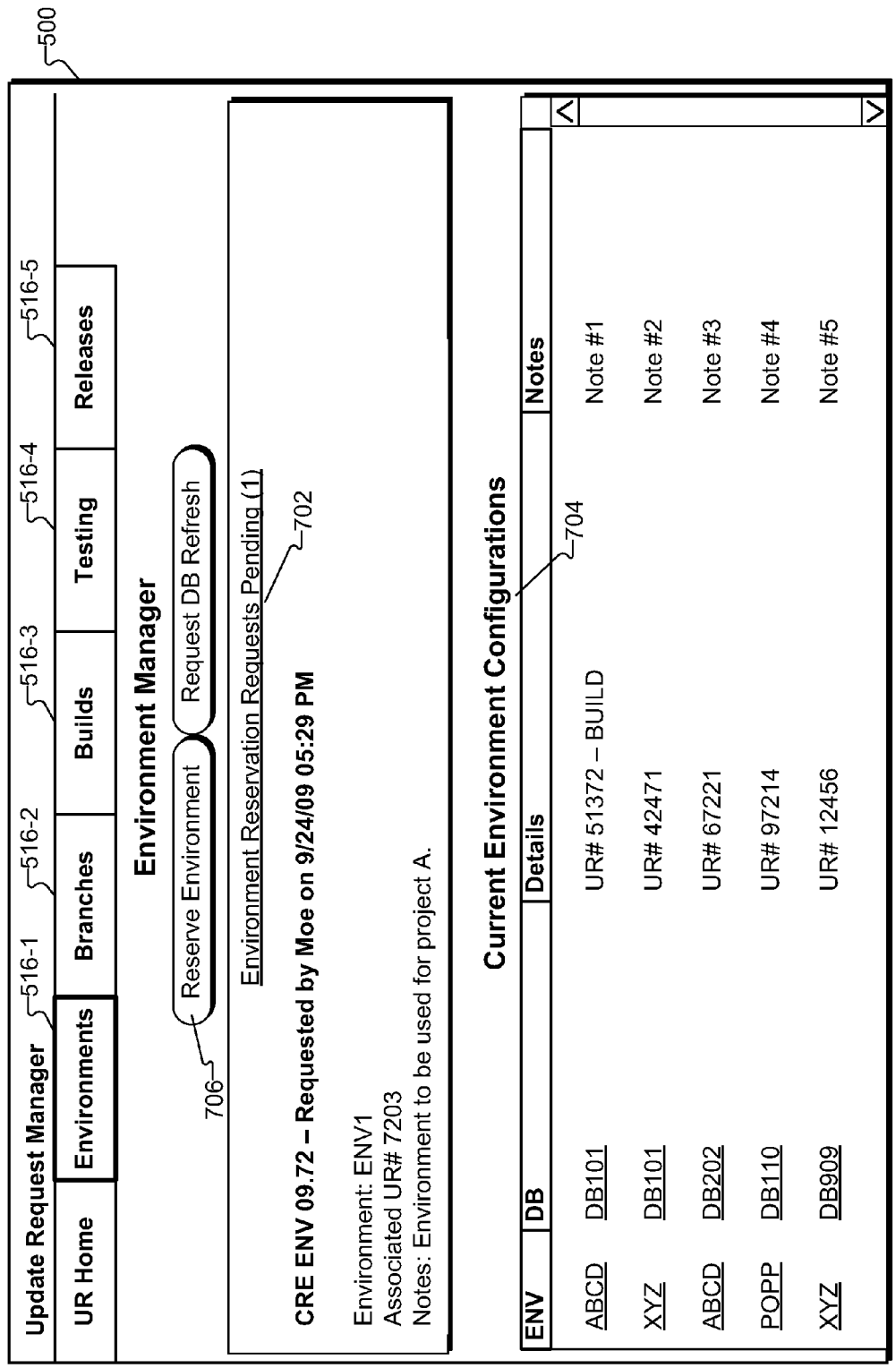

Hence, the developer may select the "environments" option 516-1 in order to view current environment configurations and reserve an environment associated with the update request. FIG. 7 shows portal 500 after the "environments" option 516-1 has been selected. As shown in FIG. 7, information 702 regarding pending environment reservation requests and information 704 regarding current environment configurations may be displayed in portal 500. A "reserve environment" option 706 may be selected by the user to reserve a particular environment associated with a particular update request.

Figure 8:
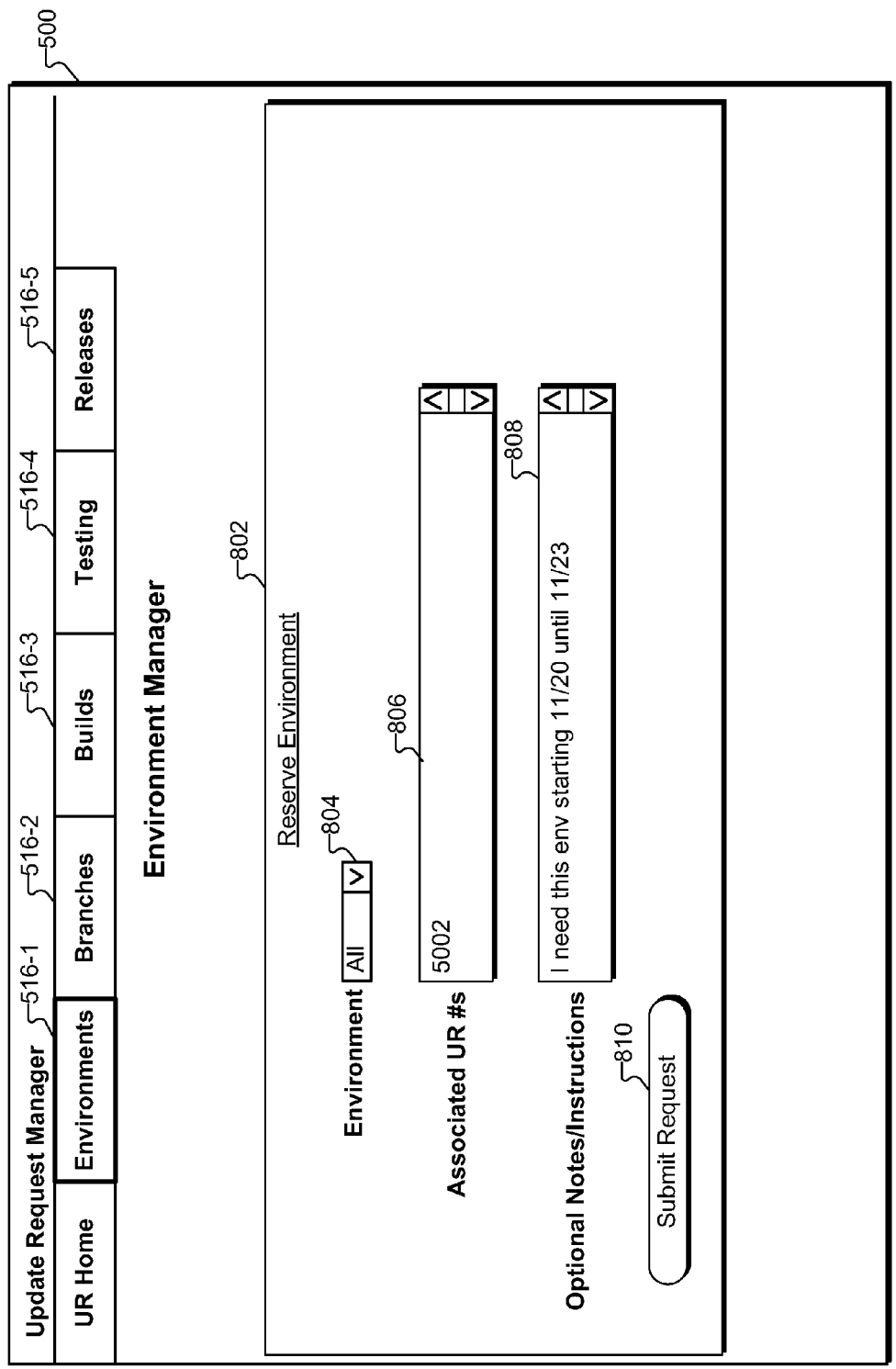

FIG. 8 shows portal 500 after the "reserve environment" option 706 shown in FIG. 7 is selected. As shown in FIG. 8, the user may be presented with a number of options 802 associated with reserving an environment. For example, the user may be prompted to select a particular environment from drop-down menu 804, input one or more update request identifiers (e.g., "5002") associated with the requested environment into field 806, and input one or more optional notes or instructions into field 808. By prompting a user to input an update request identifier into field 806, update request management facility 104 may establish a link between the requested reservation of the environment and the update request identifier. Update request management facility 104 may use the established link to track the update request throughout a software development lifecycle of a software update created in response to the update request.

The developer may select a "submit request" button 810 to transmit the environment reservation request to update request management facility 104. In response to the user input request to reserve an environment associated with the update request, an environment administrator may be notified (e.g., via email, text message, an updating of the portal as viewed by the administrator, and/or in any other manner). The environment administrator may access portal 500, review the request, and approve or deny the request. If the request is approved, software development operation facility 106 may reserve the environment and the developer may be notified accordingly.

Once an environment is reserved, the developer or other user may determine that the update request requires a modification of source code maintained by a source code repository. To modify the source code, the developer may be required to request that a "branch" of the source code be created. The developer may then modify the source code in the branch and subsequently merge the branch back into the source code repository. To request a creation of a branch, the user may select the "branches" option 516-2 included within portal 500.

Figure 9:
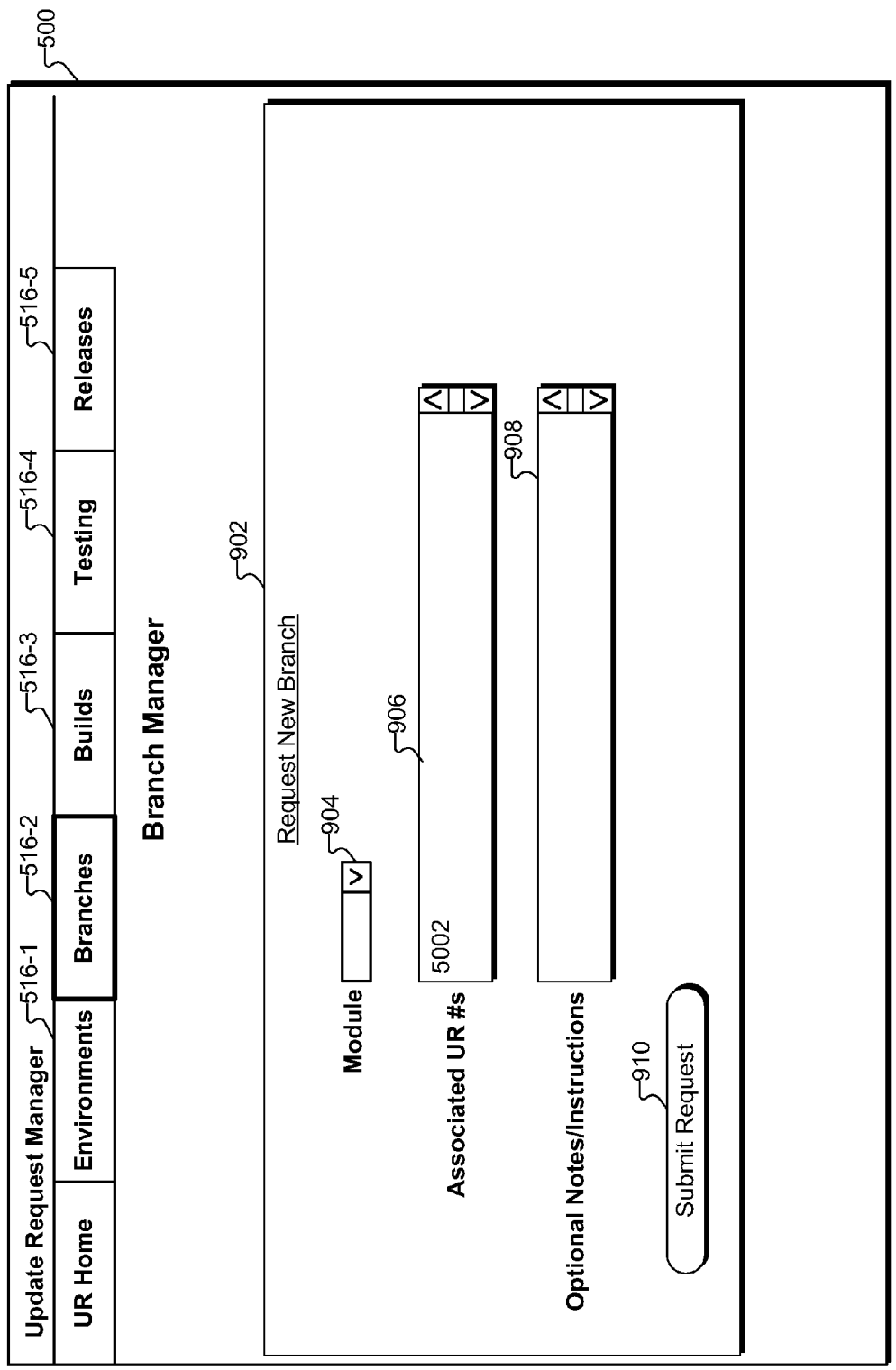

FIG. 9 shows portal 500 after the "branches" option 516-2 has been selected. As shown in FIG. 9, the user may be presented with a number of options 902 associated with requesting a new branch. For example, the user may be prompted to select a particular source code module from drop-down menu 904, input one or more update request identifiers (e.g., "5002") associated with the branch request into field 906, and input one or more optional notes or instructions into field 908. By prompting a user to input an update request identifier into field 906, update request management facility 104 may establish a link between the requested branch and the update request identifier. Update request management facility 104 may use the established link to track the update request throughout a software development lifecycle of a software update created in response to the update request.

The developer may select a "submit request" button 910 to transmit the branch request to update request management facility 104. In response to the request to create a new branch, the new branch may be automatically created by software development operation facility 106. Alternatively, the new branch may be created after the request has been approved by a source code repository administrator.

Once the new branch has been created, the developer or other user may modify source code included in the branch to implement the update request. After the source code has been modified, the developer may determine that a source code build is required to implement the source code modification. To request a build, the user may select the "builds" option 516-3 included within portal 500.

Figure 10:
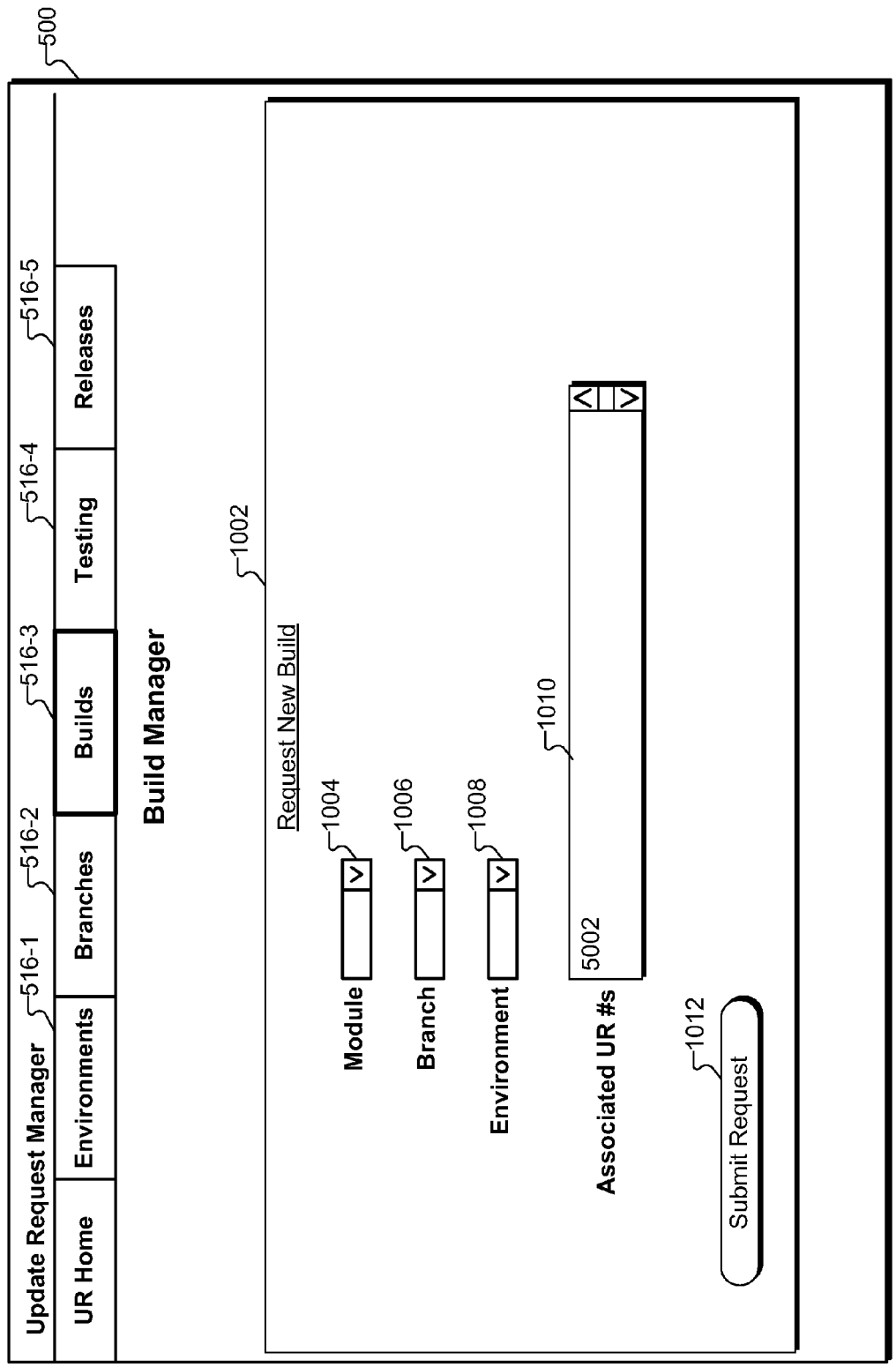

FIG. 10 shows portal 500 after the "build" option 516-3 has been selected. As shown in FIG. 10, the user may be presented with a number of options 1002 associated with requesting a new build. For example, the user may be prompted to select a particular software module from drop-down menu 1004, select a particular branch from drop-down menu 1006, select a particular environment from drop-down menu 1008, and input one or more update request identifiers (e.g., "5002") associated with the build request into field 1010. By prompting a user to input an update request identifier into field 1010, update request management facility 104 may establish a link between the requested build and the update request identifier. Update request management facility 104 may use the established link to track the update request throughout a software development lifecycle of a software update created in response to the update request.

The developer may select a "submit request" button 1012 to transmit the build request to update request management facility 104. In response, the build may be performed and auto-deployed in accordance with a pre-defined schedule. Alternatively, the build may be performed and deployed after being approved by a build administrator.

After the build has been deployed, the developer or other user may utilize portal 500 to coordinate system and/or user acceptance testing of the source code that implements the update request. A system test may be performed by one or more software development personnel (e.g., one or more software testers). A user acceptance test may be performed by one or more users of the software application (e.g., the user who submitted the update request). To coordinate system and/or user acceptance testing, the developer or other user may select the "testing" option 516-4 included within portal 500.

Figure 11:
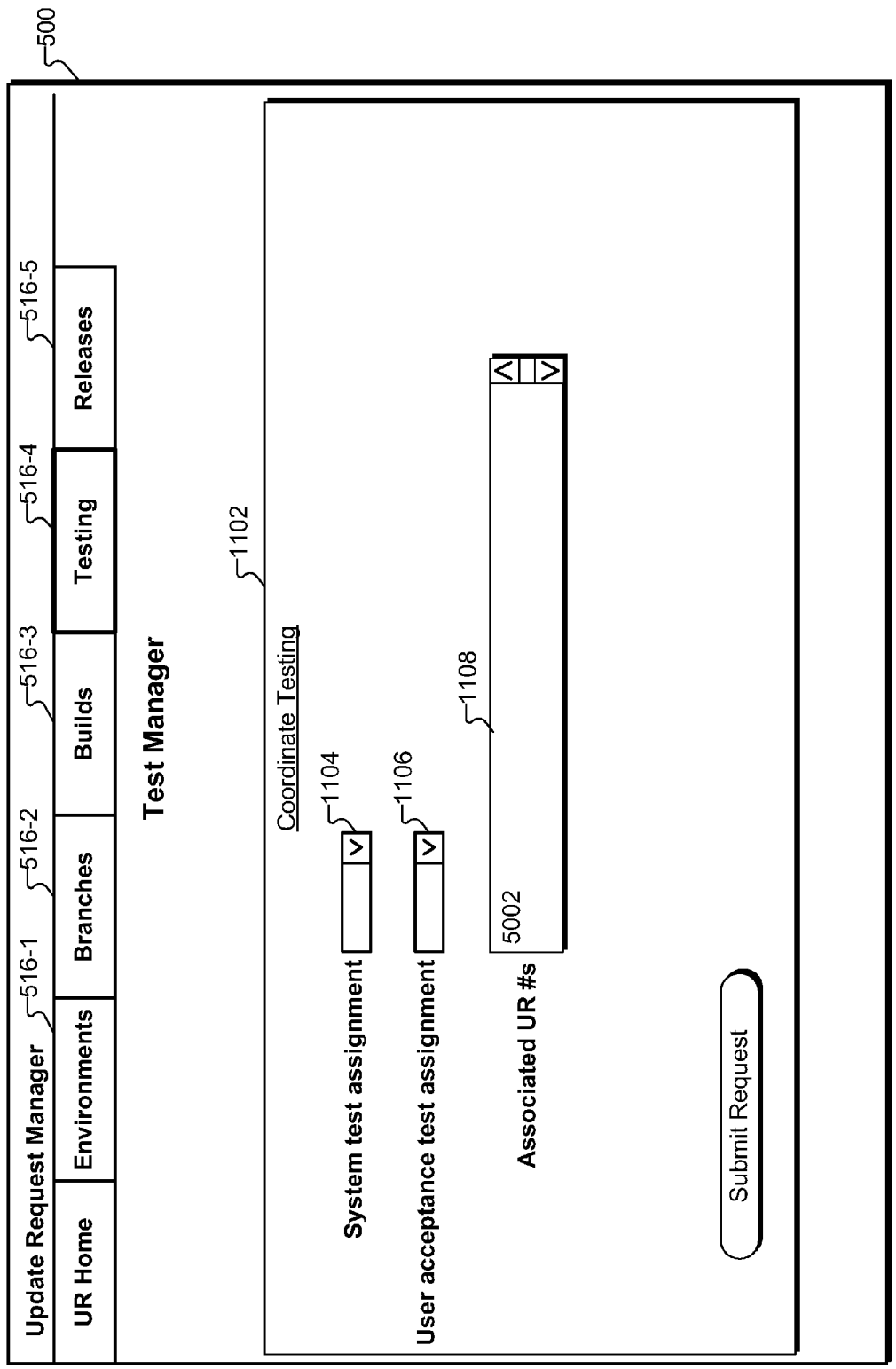

FIG. 11 shows portal 500 after the "testing" option 516-4 has been selected. As shown in FIG. 11, the user may be presented with a number of options 1102 associated with coordinating a system test and/or user acceptance test. For example, the user may be prompted to assign responsibility for the system test to another user by using drop-down menu 1104, assign responsibility for the user acceptance test to another user by using drop-down menu 1106, and input one or more update request identifiers (e.g., "5002") associated with the system and/or user acceptance testing into field 1108. By prompting a user to input an update request identifier into field 1108, update request management facility 104 may establish a link between the testing and the update request identifier. Update request management facility 104 may use the established link to track the update request throughout a software development lifecycle of a software update created in response to the update request.

After system and user acceptance testing have been performed, the developer or other user may utilize portal 500 to request a merge of the branch back into the source code repository. To this end, the developer or other user may again select the "branches" option 516-2 and request the merge.

After the branch has been merged, the software update implementing the update request may be released and deployed. In some examples, in order to release and deploy the software update, the release has to be requested, a deployment of the release has to be approved by one or more users (e.g., the user who created the update request), and a verification of the release has to be obtained. A user may select the "releases" option 516-5 included within portal 500 to perform any of these software release operations.

Figure 12:
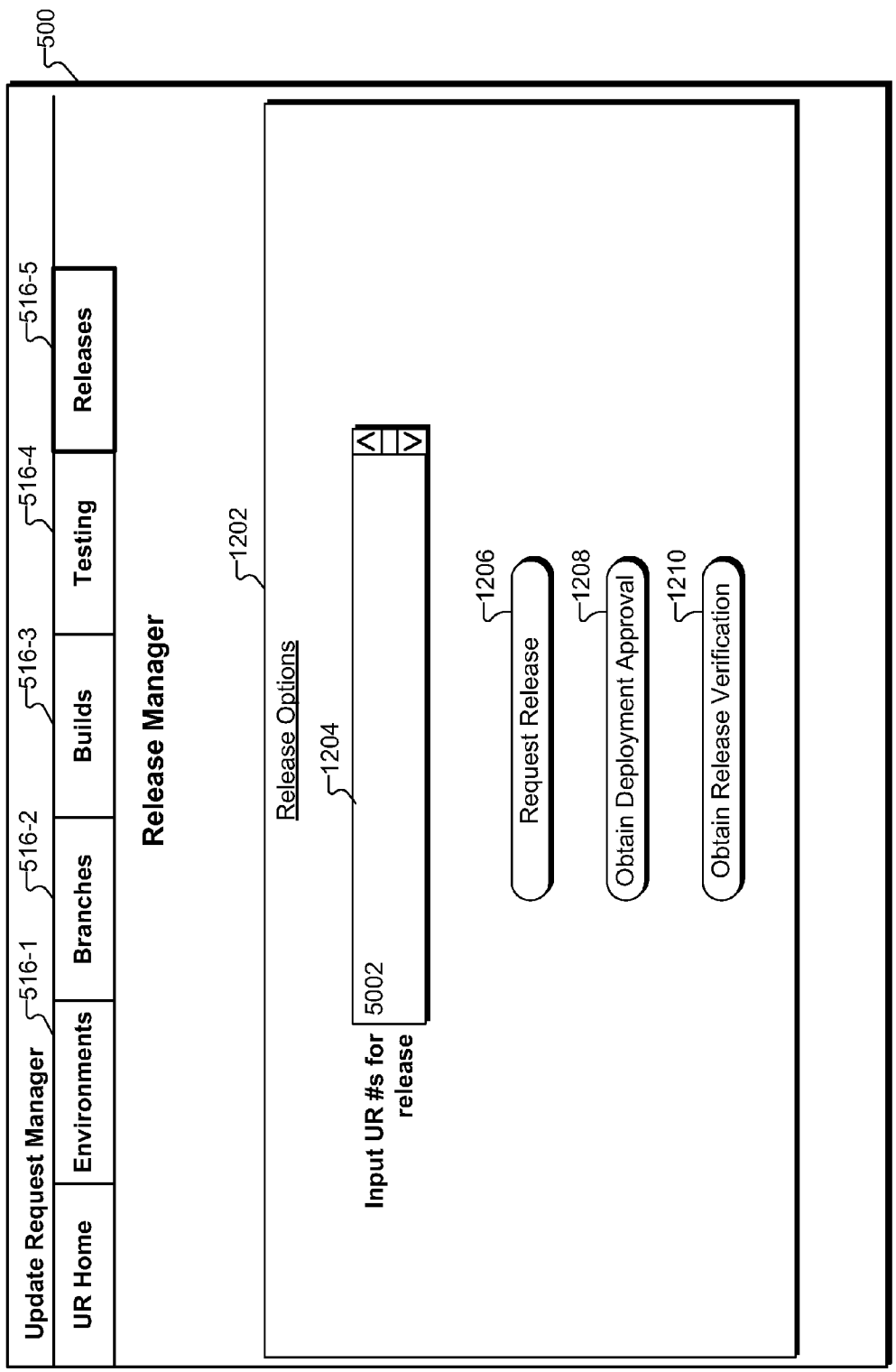

FIG. 12 shows portal 500 after the "releases" option 516-5 has been selected. As shown in FIG. 12, the user may be presented with a number of options 1202 associated with a release of a software update created in response to a particular update request. For example, the user may input an update request identifier into field 1204 and then select an option 1206 to request release of the software update, an option 1208 to obtain deployment approval from one or more users, and an option to obtain release verification 1210 from one or more users.

Returning to FIG. 5, a particular update request included within list 502 may be selected to access an audit trail associated with that update request. The audit trail may be automatically generated by update request management facility 104 as users submit requests to perform various software development operations associated with the update request. In some examples, an auditor may be given permission to access portal 500 and determine whether various auditing requirements (e.g., Sarbanes-Oxley auditing requirements) are being followed simply by selecting one or more update requests included in list 502.

As described above, the methods and systems described herein facilitate management of one or more update requests associated with a deployed software application. For example, an exemplary method includes receiving, by a software development system, data representative of an update request for a deployed software application, assigning, by the software development system, an update request identifier to the update request, displaying, by the software development system, a portal configured to facilitate management of a plurality of software development operations associated with the update request, the plurality of software development operations comprising one or more environment selection operations, one or more branch operations, one or more build operations, and one or more software release operations, receiving, by the software development system via the portal, a request input by a user to perform a software development operation included within the plurality of software development operations associated with the update request, establishing, by the software development system, a link between the requested software development operation and the update request identifier, and using, by the software development system, the established link to track the update request throughout a software development lifecycle of a software update created in response to the update request.

An exemplary system includes a communication facility configured to receive data representative of an update request for a deployed software application, an update request management facility selectively and communicatively coupled to the communication facility and configured to assign an update request identifier to the update request, provide a portal configured to facilitate management of a plurality of software development operations associated with the update request, the plurality of software development operations comprising one or more environment selection operations, one or more branch operations, one or more build operations, and one or more software release operations, receive a request input by a user via the portal to perform a software development operation included within the plurality of software development operations associated with the update request, establish a link between the requested software development operation and the update request identifier, and use the established link to track the update request throughout a software development lifecycle of a software update created in response to the update request.

An exemplary computer-readable medium includes instructions configured to direct a computing device to receive data representative of an update request for a deployed software application, assign an update request identifier to the update request, display a portal configured to facilitate management of a plurality of software development operations associated with the update request, the plurality of software development operations comprising one or more environment selection operations, one or more branch operations, one or more build operations, and one or more software release operations, receive, via the portal, a request input by a user to perform a software development operation included within the plurality of software development operations associated with the update request, establish a link between the requested software development operation and the update request identifier, and use the established link to track the update request throughout a software development lifecycle of a software update created in response to the update request.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a software development system, data representative of a plurality of update requests for a deployed software application;
   assigning, by the software development system, a unique update request identifier to each update request included in the plurality of update requests;
   displaying, by the software development system, a portal configured to facilitate management of a plurality of software development operations associated with the plurality of update requests for the deployed software application, the plurality of software development operations comprising one or more environment selection operations, one or more branch operations, one or more build operations, and one or more software release operations, wherein the software development operations are performed by the software development system;
   receiving, by the software development system via the portal, a plurality of requests to perform the plurality of software development operations associated with the update requests;
   establishing, by the software development system, a plurality of links between the requested software development operations and the update request identifiers; and using, by the software development system, the established links to track the update requests throughout a software development lifecycle of a plurality of software updates created in response to the update requests by creating, based on the established links, one or more audit trails associated with the update requests and that identify one or more activities associated with the update requests during the software development lifecycle of the plurality of software updates.

2. The method of claim 1, further comprising performing, by the software development system, the one or more of the plurality of software development operations.

3. The method of claim 1, further comprising deploying, by the software development system, one or more of the software updates created in response to the update requests.

4. The method of claim 1, wherein the one or more environment selection operations comprise a reservation of an environment associated with one or more of the update requests.

5. The method of claim 1, wherein the one or more branch operations comprise at least one of a creation of a new branch in a source code repository and a merging of the new branch back into the source code repository.

6. The method of claim 1, wherein the one or more build operations comprise a build of source code modified or created to implement one or more of the update requests.

7. The method of claim 1, wherein the one or more software release operations comprise at least one of a release of one or more of the software updates, an approval of a deployment of one or more of the software updates, and a verification of a release of one or more of the software updates.

8. The method of claim 1, wherein the plurality of software development operations further comprises one or more test operations associated with one or more of the update requests.

9. The method of claim 8, wherein the one or more test operations comprise at least one of a request to perform a system test of source code implementing at least one update request included in the update requests and a request to perform a user acceptance test of the source code implementing the at least one update request.

10. The method of claim 1, wherein the update requests comprise at least one of a request to fix a bug in the deployed software application and a request to add an enhancement to the deployed software application.

11. A system comprising:
    at least one computer device comprising:
        a communication facility configured to receive data representative of a plurality of update requests for a deployed software application; and
        an update request management facility selectively and communicatively coupled to the communication facility and configured to
            assign a unique update request identifier to each update request included in the plurality of update requests,
            provide a portal configured to facilitate management of a plurality of software development operations associated with the plurality of update requests for the deployed software application, the plurality of software development operations comprising one or more environment selection operations, one or more branch operations, one or more build operations, and one or more software release operations, wherein the software development operations are performed by the at least one computer device,
            receive a plurality of requests via the portal to perform the plurality of software development operations associated with the update requests,
            establish a plurality of links between the requested software development operations and the update request identifiers, and
            use the established links to track the update requests throughout a software development lifecycle of a plurality of software updates created in response to the update requests by creating, based on the established links, one or more audit trails associated with the update requests and that identify one or more activities associated with the update requests during the software development lifecycle of the plurality of software updates.

12. The system of claim 11, wherein the one or more environment selection operations comprise a reservation of an environment associated with one or more of the update requests.

13. The system of claim 11, wherein the one or more branch operations comprise at least one of a creation of a new branch in a source code repository and a merging of the new branch back into the source code repository.

14. The system of claim 11, wherein the one or more build operations comprise a build of source code modified or created to implement one or more of the update requests.

15. The system of claim 11, wherein the one or more software release operations comprise at least one of a release of one or more of the software updates, an approval of a deployment of one or more of the software updates, and a verification of a release of one or more of the software updates.

16. The system of claim 11, wherein the plurality of software development operations further comprises one or more test operations associated with one or more of the update requests.

17. A non-transitory computer-readable medium including instructions configured to direct a computing device to:
    receive data representative of a plurality of update requests for a deployed software application;
    assign a unique update request identifier to each update request included in the plurality of update requests;
    display a portal configured to facilitate management of a plurality of software development operations associated with the plurality of update requests for the deployed software application, the plurality of software development operations comprising one or more environment selection operations, one or more branch operations, one or more build operations, and one or more software release operations, wherein the software development operations are performed by the computing device;
    receive, via the portal, a plurality of requests to perform the plurality of software development operations associated with the update requests;
    establish a plurality of links between the requested software development operations and the update request identifiers; and
    use the established links to track the update requests throughout a software development lifecycle of a plurality of software updates created in response to the update requests by creating, based on the established links, one or more audit trails associated with the update requests and that identify one or more activities associated with the update requests during the software development lifecycle of the plurality of software updates.

* * * * *